United States Patent [19]
Zenker

[11] Patent Number: 4,776,226
[45] Date of Patent: Oct. 11, 1988

[54] POWER TAKEOFF SHAFT FOR A FARM TRACTOR

[75] Inventor: Walter Zenker, Bergisch Gladbach, Fed. Rep. of Germany

[73] Assignee: Kloeckner-Humboldt-Deutz AG, Fed. Rep. of Germany

[21] Appl. No.: 35,735

[22] Filed: Apr. 8, 1987

[30] Foreign Application Priority Data

Apr. 12, 1986 [DE] Fed. Rep. of Germany ....... 3612418

[51] Int. Cl.$^4$ .......................... B60K 17/28; F16H 5/06
[52] U.S. Cl. .................................... 74/15.4; 74/15.66; 74/373
[58] Field of Search .................. 74/15.2, 15.4, 15.66, 74/373

[56] References Cited

U.S. PATENT DOCUMENTS

| 3,279,275 | 10/1966 | Christie | 74/15.4 X |
| 3,513,712 | 5/1970 | Zajichek et al. | 74/15.2 |
| 3,830,111 | 8/1974 | Travaglio | 74/15.4 |
| 3,991,629 | 11/1976 | Dearnley | 74/15.4 |

FOREIGN PATENT DOCUMENTS

| 56-31547 | 3/1981 | Japan | 74/15.4 |
| 56-35844 | 4/1981 | Japan | 74/15.4 |

Primary Examiner—Allan D. Herrmann
Attorney, Agent, or Firm—Charles L. Schwab

[57] ABSTRACT

A power takeoff mechanism for a farm tractor with two interchangeable power takeoff shafts which can be driven at different speeds and are connected by means of annular flanges of different diameters with a driving flange on the end of an output shaft wherein a pawl is pivoted near the driving flange and is connected to a clutch lever of the gear shifting mechanism whereby the pawl must be pivoted to a predetermined position when one of the power takeoff shafts is installed, thereby preventing the clutch lever from being operated in a manner to select an inappropriate speed for the installed power takeoff shaft.

16 Claims, 1 Drawing Sheet

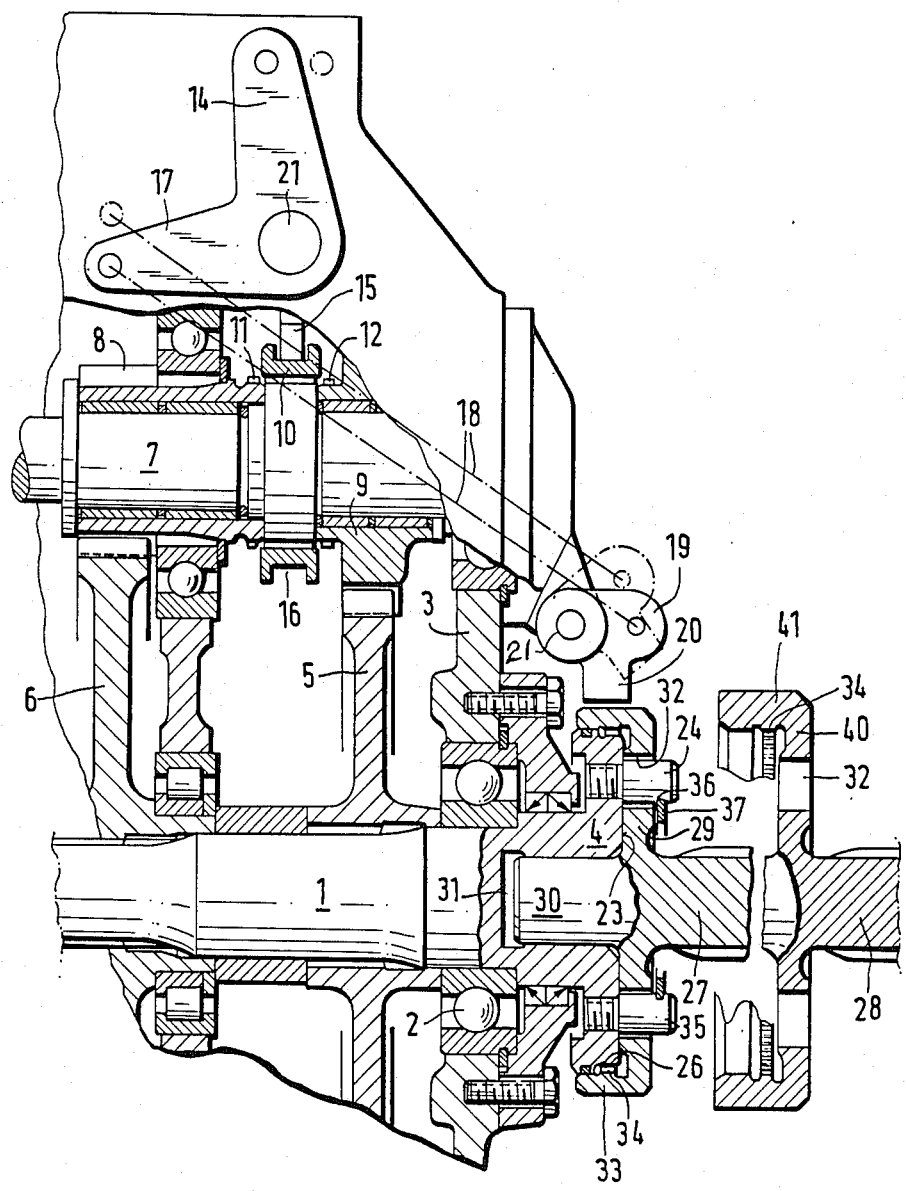

POWER TAKEOFF SHAFT FOR A FARM TRACTOR

TECHNICAL FIELD

This invention relates to a power takeoff arrangement for a farm tractor of the type having an output shaft extending from the transmission casing which can be selectively driven by the tractor engine at two different speeds via mechanical gearing. More particularly, this invention relates to a power takeoff arrangement having selectively interchangeable power takeoff shafts of different end contours for different speeds and including interlock means between the power takeoff change speed transmission and the interchangeable shafts which prevents an improper speed for the selected power takeoff shaft.

PRIOR ART STATEMENT

U.S. Pat. No. 3,513,712, issued May 26, 1970 to W. J. Zajichek et al for "Power Take-Off Assembly", shows a power takeoff arrangement for a farm tractor which provides interchangeable output shafts for two output speeds. The power takeoff shaft consists of two spline ends extending in opposite directions from a drive flange with differing connection contours on its axially opposite sides. The power takeoff shaft is driven by the flange, which can be coupled using bolts with one of two coaxially arranged flanges on tractor output shafts which are driven at two different predetermined speeds. Three threaded boreholes are provided in each of the coaxial driving flanges. The flange of the power takeoff shaft can be connected with one or the other driving flange by means of three bolts. There is the possibility of an error during assembly with a power takeoff shaft design of this type since, in the illustrated borehole arrangement, a bolt can be inserted incorrectly. This would lead to an incorrect assignment of speed for the chosen spline at the power takeoff shaft end, and could result in damage to the power takeoff shaft arrangement in the event the improperly inserted bolt is sheared off. In addition, switchable power takeoff shafts of this design type are barred from use in several countries by the authorized technical testing authorities.

OBJECTS AND BRIEF SUMMARY OF THE INVENTION

The main object of the invention is to provide a power takeoff arrangement having two interchangeable power takeoff shafts and a relatively simple safety device which prevents operation at an unacceptable speed.

The foregoing and other objects are met by providing different diameter flanges on the interchangeable power takeoff shafts together with a pawl pivoted on the change speed power takeoff transmission casing and which is connected to the transmission speed control member. The large diameter flange prevents the pawl from occupying one of its pivoted positions and in turn, the speed control member cannot be shifted to select an inappropriate power takeoff speed. This invention prevents power takeoff driven equipment from being driven at a higher speed than that for which it was designed.

In the illustrated embodiment of the invention, the annular flanges on the power takeoff shafts are cup-shaped, each having an axially extending collar which, in the installed condition of the power takeoff shaft, surrounds a driving flange on the end of the output shaft of the change speed transmission.

A good torque transmitting connection may be provided between the driving flange and the power takeoff shaft by providing an interior ring gear in the collar of the power takeoff shaft and an external ring gear on the driving flange which forms a spline fit with the interior ring gear in the installed condition of the power takeoff shaft.

A torque transmitting connection may be formed by axially extending pins secured to the driving flange of the output shaft and axial holes or openings in the annular flanges of the power takeoff shaft through which the pins extend in the installed condition of the power takeoff shaft. Radially opening grooves may be formed in the ends of the pins extending through the annular flange openings and a snap ring may engage the grooves to keep the power takeoff shaft in assembly with the output shaft. A bushing may be slid over the output end of the power takeoff shaft, after the latter is installed on the output shaft, so as to prevent removal of the snap ring.

The pawl may be pivotally mounted on the transmission casing near the end of the output shaft for movement about an axis transverse to the axis of the output shaft and connected to the shift control for the power takeoff change speed transmission. The flange on one of the power takeoff shafts coacts with the pawl to prevent selection of the incorrect speed for the power takeoff shaft.

In the illustrated embodiment of the invention, the flange on the high speed power takeoff shaft has a smaller diameter than the flange on the low speed power takeoff shaft.

When the flanges on the interchangeable power takeoff shafts are cup-shaped, the internal diameters of the flange collars are the same but the outer diameters of the flange collars are different.

BRIEF DESCRIPTION OF THE DRAWING

One embodiment of the invention is shown in the drawing which is a partial vertical section through the axis of the output shaft of a power takeoff mechanism.

DETAILED DESCRIPTION OF THE DRAWING

An output shaft 1 of a mechanical change speed power takeoff transmission at the rear of a tractor is supported at its rear end by a roller bearing 2 mounted in a rear wall of a transmission casing 3 and has a driving flange 4 at its rear end which is disposed outside the casing 3. The change speed transmission includes spur gears 5 and 6 which are secured for rotation with the output shaft 1. The gears 5 and 6 mesh with spur gears 9 and 8, respectively, which are rotatably mounted on an input or drive shaft 7, which is parallel to the output shaft 1 and is driven by the tractor engine, not shown. Between the two spur gears 8 and 9 is an axially shiftable clutch collar 10 which has internal spline teeth forming a sliding spline connection with external spline teeth on the drive shaft 7. The clutch collar 10 can be displaced axially from its illustrated neutral position to the left or to the right, so that its internal spline teeth drivingly engages clutch teeth 11 on the spur gear 8 or the clutch teeth 12 on the spur gear 9.

A clutch lever 14 pivotally mounted on the casing 3 above shift collar 10 is operable to axially shift the collar 10. The shift lever 14 operates a control claw 15 which fits in a groove 16 of the shift collar 10. The clutch lever 14 includes an arm 17 which is connected to an arm 19 of a detent in the form of a pawl 20 by a motion transmitting member in the form of a rigid rod 18. The pawl 20 is pivotally supported on the casing 3 by a pivot pin 21 whose axis is transverse to the axis of the output shaft 1 and transverse to the longitudinal axis of the vehicle. The pawl 20 is located above the flange 4 of the output shaft 1, approximately in a vertical plane radially above it, and is moved from the illustrated lowered control position to a raised nonblocking position by the clutch lever 14 as it is operated to shift from a high speed position to a low speed position.

The end flange 4 of the output shaft 1 carries at its outer side 23 several axially extending pins 24 which are evenly distributed about a circle whose center lies in the axis of the output shaft 1 and in addition, it has spline teeth forming an external ring gear at its axially outer edge.

Alternate power takeoff shafts 27, 28 are used to connect various power operated equipment in driven relation to the output shaft 1. The output ends of the shafts 27, 28 have different contours, such as a different number and/or shape of spline teeth, which connect with equipment to be driven at the respective drive speeds of the shafts 27, 28, such as 1000 and 540 revolutions per minute (rpm). The power takeoff shaft 27 has an annular flange 29 with an integral cylindrical extension 30 which, when the power takeoff shaft 27 is in its illustrated installed condition, has a pilot fit with a central coaxial cavity 31 of the output shaft 1. A plurality of circumferentially positioned axial bores or openings 32 are drilled in the flange 29 so as to register with and receive the pins 24 of the driving flange 4. In addition, the flange 29 is rendered cup-shaped by an integral cylindrical collar 33 which projects axially from the circumference of the flange 29. Along the radially inner side of collar 33 there are internal spline teeth 34 which drivingly engage the external spline teeth 26 on the flange 4 whereby the collar 33 and the shaft 1 rotate as a unit. Thus, the teeth 34, 26 are torque transmitting members which are brought into torque transmitting engagement when the power takeoff shaft 27 is installed on the output shaft 1.

The pins 24 are secured to and extend from the outer side 23 of the flange 4 in an axial direction away from the casing 3 and through the bores 32. The ends 35 of the pins 24 extending beyond the bores 32 of the flange 29 have slots 36 formed therein which open in a radially inward direction to receive a resilient snap ring 37. In addition, an axially displaceable bushing can be slid axially onto the output end of whichever power takeoff shaft 27 or 28 is installed so as to be in radially confronting relation to the inner diameter of the snap ring 37 and thereby prevent it from being contracted, thus releasably locking the snap ring 37 in place. When the power takeoff shaft 27 is installed, the clutch lever 14 can be set at a speed of either 1000 rpm or a speed of 540 rpm since the small outer diameter of the flange 33 allows the pawl 20, which is connected to the clutch lever 14, to be in either of its positions of adjustment. The correct operational speed for the power takeoff shaft 27 is 1000 rpm. If, however, a speed of 540 rpm is selected inadvertently for the power takeoff shaft 27, the lower speed is not viewed as being hazardous, even though operationally it is not the correct speed. The other power takeoff shaft 28 is similar to the power takeoff shaft 27; however, the annular flange 40 has a larger outer diameter which is achieved by forming the collar 41 with a greater radial thickness. The inner diameter of the collar 41 is the same as the inner diameter of the collar 33 of the power takeoff shaft 27. When the power takeoff shaft 28 is connected in driven relation to the end flange 4 of the output shaft 1, the larger diameter flange 40 prevents the pawl 20 from occupying its high speed position (1000 rpm), shown in solid lines, and instead will occupy its low speed position (540 rpm) shown in broken lines. This ensures that the power takeoff shaft 28 can only be operated at the proper speed of 540 rpm.

The exchanging of power takeoff shafts 27, 28 can easily be carried out by, for example, axially displacing a locking bushing, not shown, and removing the snap ring 37, which is designed to resiliently contract radially to a smaller diameter.

The embodiments of the invention in which an exclusive property or privilege is claimed are defined as follows:

1. A power takeoff mechanism for a farm tractor having an output shaft with an end which extends from a casing and can be selectively driven by an engine of the tractor at two different speeds via a mechanical transmission with change speed gearing, wherein interchangeable high speed and low speed power takeoff shafts are alternately connectable in driven relation to the output shaft end and have different output end contours for connection to various apparatus driven at one or the other of said speeds and wherein a safety device is provided to ensure that at least one of the power takeoff shafts is prevented from being driven at one of said speeds, characterized by an annular flange on each of said interchangeable power takeoff shafts, said flanges having different outer diameters, a control device operatively associated with said transmission and shiftable between high and low speed positions of adjustment, a pawl supported on said casing for movement between first and second positions, means connecting said pawl to said control device whereby said pawl is in said first and second positions, respectively, when said control device is in its high and low speed positions, and said flange with the largest diameter preventing said pawl from occupying one of its positions when the power takeoff shaft having said flange with the largest diameter is connected in driven relation to said end of said output shaft.

2. The power takeoff mechanism of claim 1 wherein the output shaft has a driving flange at its end and each of the annular flanges of the power takeoff shafts is cup shaped with an axially extending collar which surrounds said driving flange of the output shaft when the associated power takeoff shaft is connected in driven relation to said end of said output shaft.

3. The power takeoff mechanism of claim 2 wherein the internal diameters of said collars are the same and the exterior diameters of said collars are different.

4. The power takeoff mechanism of claim 2 wherein each of said power takeoff shafts has internal gear teeth in its collar and said driving flange has external gear teeth forming a driving spline connection with said internal gear teeth when the associated power takeoff shaft is connected in driven relation to said end of said output shaft.

5. The power takeoff mechanism of claim 4 wherein said driving flange presents a plurality of axially extending pins whose axes lie in a circle concentric with said output shaft and wherein each of said annular flanges of said power takeoff shafts have openings through which said pins extend when the power takeoff shafts are alternately connected in driven relation to said end of said output shaft.

6. The power takeoff mechanism of claim 2 wherein said driving flange presents a plurality of axially extending pins whose axes lie in a circle concentric with said output shaft and wherein each of said annular flanges of said power takeoff shafts have openings through which said pins extend when the power takeoff shafts are alternately connected in driven relation to said end of said output shaft and further comprising a radially opening slot formed in the portion of each pin extending through said openings in said annular flange of an installed power takeoff shaft and a releasable snap ring operatively engaging said slots and preventing axial removal of the installed power takeoff shaft.

7. The power takeoff mechanism of claim 1 wherein said pawl is pivotally connected to said casing on an axis transverse to the axis of said output shaft, and said control device includes a clutch lever pivotally mounted on said casing and a rod pivotally connected at its opposite ends, respectively, to said lever and said pawl.

8. The power takeoff mechanism of claim 1 wherein the diameter of the flange on the low high speed power takeoff shaft is greater than the diameter of the flange on the high speed power takeoff shaft.

9. A power takeoff mechanism for a farm tractor of the type having an output shaft extending from a casing which is selectively driven by the tractor engine via a change speed transmission at two different speeds and wherein the output end of the output shaft is adapted for driving connection to low speed and high speed power takeoff shafts, only one of which being drivingly connected at any one time and said power takeoff shafts presenting different end contours for connection to different apparatus operable at different speeds, characterized by
   an annular flange on each of said power takeoff shafts, one of said flanges having a greater outer diameter than the other flange and
   a gear shift mechanism for changing the speed of said output shaft including
   a control member shiftable between a low speed position in which said output shaft is driven at a low speed and a high speed position in which said output shaft is driven at a high speed and
   a detent shiftably mounted on said casing near said output end of said output shaft,
   motion transmitting means interconnecting said detent and said control member whereby said detent is shifted between first and second positions, respectively, upon movement of said control member from its low speed position to its high speed position, said large flange on said one power takeoff shaft preventing said detent from occupying one of its said positions when said one power takeoff shaft is connected in driven relation to said output end of said output shaft.

10. The power takeoff mechanism of claim 9 wherein said detent is a pawl pivotally mounted on said casing above said output end of said output shaft and said motion transmitting means includes a rigid motion transmitting member.

11. The power takeoff mechanism of claim 10 wherein the outer diameter of said annular flange of said low speed power takeoff shaft is greater than the outer diameter of said annular flange of said high speed power takeoff shaft.

12. The power takeoff mechanism of claim 9 wherein said output end of said output shaft includes a driving flange and engageable torque transmitting members are formed on said driving flange and on said annular flanges of said power takeoff shafts.

13. The power takeoff mechanism of claim 12 wherein said annular flanges include integral axially extending collars and said torque transmitting members on said annular flanges are internal splines in said collars.

14. The power takeoff mechanism of claim 13 wherein said outer diameter of said annular flange of said low speed power takeoff shaft is greater than the outer diameter of said annular flange of said high speed power takeoff shaft.

15. The power takeoff mechanism of claim 9 wherein said annular flanges each have a plurality of openings extending in the axial direction of said power takeoff shafts and said output end of said output shaft presents a plurality of axially extending pins whose axes lie in a circle concentric with said output shaft and wherein said pins extend through said openings when the power takeoff shaft in which said openings are formed is installed in driven relation on said output end of said output shaft.

16. The power takeoff mechanism of claim 15 wherein said outer diameter of said annular flange of said low speed power takeoff shaft is greater than the diameter of said annular flange of said high speed power takeoff shaft.

* * * * *

UNITED STATES PATENT OFFICE
CERTIFICATE OF CORRECTION

Patent No. 4,776,226　　　　Dated October 11, 1988

Inventor(s) Walter Zenker

It is certified that error appears in the above-identified patent and that said Letters Patent are hereby corrected as shown below:

Col. 5, line 27, delete "high".

Signed and Sealed this

Twenty-first Day of February, 1989

Attest:

DONALD J. QUIGG

*Attesting Officer*　　　　*Commissioner of Patents and Trademarks*